3,663,463
NONCOMBUSTIBLE AND FIREPROOFING POLYMER COMPOSITIONS AND PROCESS
Henry K. Wren, 8521 Lamira Lane,
Indianapolis, Ind. 46234
No Drawing. Filed July 16, 1970, Ser. No. 55,589
Int. Cl. C08f 47/08; C08j 1/22
U.S. Cl. 260—2.5 FP                    20 Claims

ABSTRACT OF THE DISCLOSURE

Noncombustible and fireproofing polymer compositions are prepared by reacting via a condensation mechanism, a polyol, an organic anhydride, or an organic acid, and boric acid to form first an esterified material and then further condensing this first esterified material with both a nitrogenous spumific compound and a carbohydrate class compound to form the noncombustible and fireproofing polymer compositions. The polymer compositions may then be formed into noncombustible films, sheets, laminates or fibers, cast, extruded or otherwise formed into articles or may be incorporated into paints, lacquers, varnishes, plastics, rubbers, to yield these materials fireproof, and additionally may be coated alone or as a further composition on fibers, fabrics, wood, paper, cardboard, plastics, leather, wire and so on.

BACKGROUND OF THE INVENTION

This invention relates to a polymer which is noncombustible, and further to a polymer which on being incorporated into a further substance renders that further substance essentially fireproof.

Fire to this day remains one of the main problems of civilization. Clothes, furnishings, construction materials and such are to a high percentage composed of substances which support combustion. And for almost as long as this has been a problem there have been attempts at solving it. The present invention sets out novel esterified condensation polymeric compositions which to a high degree solve the problem.

The polymers of this invention are noncombustible, and when incorporated into or applied onto other substances render these substances fireproof. And in a further and distinct advantage, when these polymer compositions are in a high heat or flame environment they intumesce without smoking or evolving harmful and hazardous fumes and suppress combustion. The uses for these polymer compositions, either alone, or in combinations to fireproof other substances are so great as to be incapable of adequate enumeration.

These condensation polymer compositions are useful in making various materials such as plastic articles, films, sheets, foams, adhesives, fibers, and laminates where they may be used alone, or in mixtures with other monomers, or these condensation polymer compositions may be added in an amount to fireproof other materials. Illustrative of materials into which these condensation polymer compositions may be incorporated are plastics such as acrylics and vinyls, adhesives, asphalts, linoleums, rubber, leather, paints, laquers, varnishes and so on. Further these condensation polymer compositions may be impregnated into or used as coatings for wire, paper, plastics, cardboard, wood, leather, fabrics and many other combustible materials. In essence the uses of the present condensation polymers as noncombustible and fireproofing polymer compositions are limited solely by the presently known needs. As further needs become evident, these condensation polymer compositions will be useful in satisfying these needs.

As set out above there have been many attempts to solve this problem. However, in general, prior materials have not been completely satisfactory, or free from adverse effects, in producing a material which is noncombustible, has good intumescent properties, good adherence characteristics, and does not give off harmful and hazardous fumes or intumescence. Other prior materials have been water sensitive, and when subjected to humid environments lose their fireproofing properties. Still other prior materials when used as part of compositions to fireproof materials, such as fireproof coatings, have poor adherence and tend to flake off or peel, thereby exposing the substrate to the fire hazard and affording little or no protection. And further the majority of prior art intumescent fireproofing materials are characterized in that they give off noxious and/or hazardous fumes such as chlorine and other halogen materials. Typical of some of these prior materials which have been used are set out in U.S. Pats. 3,401,127 and 3,452,116. The flame retardant resin compositions of U.S. Pat. 3,401,127 are not highly intumescent compositions, however they do comprise a halogenated component which can yield noxious fumes in a heat and/or flame environment. U.S. Pat. 3,452,116 although directed to different flame retarding resin compositions, also relies on a halogenated component to yield this fire retarding property. The present invention comprises a noncombustible and flame proofing which does not rely on halogens for this property, but rather intumesces yielding nontoxic or nonhazardous substances and extinguishes and retards a flame.

It is an object of this invention to set out an intumescent resin composition which is noncombustible and fireproofing in heat and flame environments.

It is also an object of this invention to disclose a polyester composition which comprises the condensation product of a polyol, organic anhydride or acid, and boric acid, and which is further condensed with a nitrogenous spumific substance and a carbohydrate class material.

It is further an object of this invention to produce noncombustible articles from an intumescent condensation polymer composition, and to further incorporate this polymer composition in other substances to render these substances essentially fireproof.

It is additionally an object of this invention to produce noncombustible fibers, adhesives, films, sheets, laminates and cast and extruded articles and further to incorporate these resins into paints, plastics, asphalts, linoleums and rubbers and to coat papers, cardboards, leather, plastics, wood, rubber fabrics and so on to render them fireproof.

And as another object this invention sets out resin compositions which intumesce in a heat or flame environment, but do not evolve noxious or hazardous fumes.

BRIEF SUMMARY OF THE INVENTION

This invention comprises an intumescent noncombustible and fireproofing condensation polymer composition which consists essentially of the condensation reaction product of a polyol, an organic anhydride or acid, and boric acid which is then further condensed with a nitrogenous spumific compound and a carbohydrate class compound. This final esterified condensation product can then be formed into noncombustible films, adhesives, sheets, fibers, laminates, insulations, encapsulations, castings, extrusions and so on, or may be added to or coated on other substances to impart fireproofing properties. Such other substances are exemplified by paints, varnishes, laquers, plastics such as vinyls and acrylics, linoleum, rubber, foams, leather, fabrics, papers, cardboards, wood, wire as insulation, and so on.

BROAD DESCRIPTION OF THE INVENTION

This invention comprises noncombustible and fireproofing polymer compositions, the method of producing these condensation polymer compositions, and the method of use of these compositions to produce noncombustible articles and the incorporation into other materials to fireproof these materials.

For clarification, the terms of art used in this specification have the following meanings. By noncombustible is meant materials which do not support combustion, that is, are flame resistant, and which in a flame and/or heat environment will not support this environment. Included are materials which decompose by nonflame producing mechanisms. By the term fireproof as used herein is meant that in a flame and/or heat environment support of this environment is inhibited. For purposes in this application the terms fire retardant and fireproof will be regarded as being synonymous in meaning and designation. Intumescent as used herein designates a material which on heating decomposes by a foaming or frothing mechanism, evolving in this use nontoxic and nonsmoke producing gaseous products. Other terms as used in this specification will have their generally accepted meanings, or will be further herein defined.

Broadly this invention comprises new noncombustible polymeric compositions which consist of the ester condensation reaction products of a polyol; a second component which is a monocarboxylic acid, dicarboxylic acid or acid anhydride; and boric acid, which is then further condensed with a nitrogenous spumific agent and a carbohydrate. The synthesis is preferably carried out in a two stage process. In the first stage the polyol, the second component monocarboxylic acid, dicarboxylic acid or acid anhydride, and boric acid are heated in a reactor at 400° F. to 550° F. until esterified, that is for from 1 to 12 hours. During this heating it is preferred that the reactor be stirred. The ratio of these substances, one to the other, may vary over the operable range necessary to form a continuous polymeric material. However a specifically useful range is:

| | |
|---|---|
| Mole polyol | 0.50–1.5 |
| Mole second component | 0.50–1.5 |
| Mole boric acid | 0.15–1.5 | with a preferred range being

| | |
|---|---|
| Mole polyol | 1.0–1.5 |
| Mole second component | 0.5–1 |
| Mole boric acid | 0.5–1 |

During the condensation reaction water is evolved as a side product. In the second stage of the synthesis reaction the condensation product from the first stage is cooled to 150° F. to 300° F., preferably to about 200° F., and a nitrogenous spumific material, a carbohydrate and an acid catalyst are added. These added substances further reactively condense with the condensation product of the first stage. These materials are added as solids, or as a slurry in a solvent such as the monoalkyl glycol ethers and dialkyl glycol ethers. Suitable solvents are Carbitol, Cellosolve, methyl Cellosolve and butyl Cellosolve. The mixture is maintained at 150–300° F. with mixing until the mixture turns clear. At this point the second stage condensation reaction is essentially complete. At this point, depending on the subsequent use, the polymer product may be cooled, purified, mixed with various solvents or monomers, or any combination of these. At this point the noncombustible condensation polymer has been synthesized and is in a condition for the desired use.

The polyols useful in producing the esterified polymers of this invention are those having two or more -ol groups. Illustrative of specifically useful polyols are ethylene glycol, propylene glycol, diethylene glycol, the glycerols, pentaerythritol, dipentaerythritol and tripentaerythritol. The generally useful second components in the first stage have been set out as monocarboxylic acids, dicarboxylic acids, and acid anhydrides. Specifically useful materials are acids such as benzoic, maleic and salicylic acids, and maleic and phthalic anhydrides. These second components along with boric acid ($H_3BO_3$) condensively react with the polyols.

The second stage components are a nitrogenous spumific material and a carbohydrate class compound. In this application a nitrogenous spumific material means an organic amine or amide compound which is capable of a heat produced foaming or frothing type of reaction. Specifically preferred spumific materials are dicyandiamide, urea, melamine or guanidine. Other similar compounds may be used as long as they are capable of condensation reaction and further when exposed to heat, toxic and hazardous fumes are not produced. The carbohydrate component in the second stage reaction may be any one of the well known carbohydrates such as the starches, sucrose, galactose, mannose, or any of the sugar alcohols such as mannitol or sorbitol. The catalyst for this second stage must be one to produce an acid value, with phosphoric acid being preferred. Catalytic amounts are used.

After synthesis, as set out above, the condensation polymer may be cooled and stored, or a solvent or a monomer material may be added. In one preferred embodiment this condensation polymer is mixed with a vinyl monomer such as styrene, vinyl toluene, acrylic polymers such as methyl acrylate and ethyl acrylate or vinyl acetate. These polymers are added to be in a concentration of from 20 to 80 percent, and preferably of about 50 to 70 percent by weight of the total mixture. The resulting polymer mixtures may then be cured using known standard techniques to produce the desired articles, or further mixed with other resins.

In a second preferred embodiment the condensation polymer is mixed with a solvent such as one or a mixture of the monoalkyl and dialkyl glycol ethers. These glycol ethers solubilize the polymers for further incorporation into varnishes, paints and other similar materials, may be used directly for fireproof coatings on, or may be impregnated into papers, woods, cardboards, leathers, asphalts, fabrics and similar materials. Suitable solvents are Carbitol, Cellosolve, methyl Cellosolve and butyl Cellosolve. When the condensation polymer is incorporated into latex paints, it is preferred that the latex medium be of an acidic pH. Generally there is no need to adjust pH since the most common latex bases are of polyvinyl acetate which exhibits an acidic pH.

In the instances when the condensation polymer is to be incorporated directly into an other plastic, and where the use of a solvent or other material is not feasible, use of a wetting agent may be necessary. The production of foams using toluene diisocyanate illustrates an instance when it is preferred to use a wetting agent since solvents would be deleterious.

The following examples are set out to further amplify the present invention.

Example I 1 mole pentaerythritol, .66 mole phthalic anhydride and .33 mole boric acid are charged into a reactor. Heating and agitation are initiated with the mixture being heated to 475–500° F., until esterified. The esterified product is cooled to 200° F. and 1 mole of dicyandiamide and 0.10 mole of starch is added as a slurry in Cellosolve. 5 g. of phosphoric acid (85%) is then added to catalyze the addition of the dicyandiamide-starch to the prior esterified product. Agitation is continued and the temperature is held at 200° F. until clear. 0.1% by weight of a hydroquinone inhibitor is added to this condensation mixture. The condensation mixture is then reduced in concentration to 30% by weight by the addition of styrene monomer under continued agitation. To one hundred parts of this resin mixture is added 0.06 parts of 6% cobalt naphthenate. 1% by weight of paraffin is added as a solution in styrene. Stirring is continued and 1.0 part of 60% methyl ethyl ketone peroxide in dimethyl phthalate is added. The system cures to a hard solid which when placed in a flame environment, intumesces with the evolution of an essentially clear gaseous material.

Example II 1 mole pentaerythritol, .66 mole phthalic anhydride and .33 mole boric acid are charged into a reactor. Heating and agitation are initiated with the mixture being heated to 475–500° F., until esterified. This esterified mixture is then cooled to 200° F. and 1 mole of dicyandiamide and 0.10 mole of chlorinated starch are added as a solid. 5 g. of phosphoric acid (85%) is then added to catalyze the addition of the dicyandiamide and chlorinated starch to the prior esterified product. This mixture is held at 200° F. until clear. Then .01% hydroquinone inhibitor is added, and the mixture is then reduced 30% concentration by weight by the addition of ethyl acrylate monomer with continued agitation. The temperature is then allowed to drop to ambient temperatures and the resin mixture is stored in sealed containers for later use in forming molded objects.

Example III

The procedure of Example II is repeated except that vinyl toluene is added in place of the ethyl acrylate.

Example IV 1.0 mole pentaerythritol, 0.66 phthalic anhydride and 0.33 mole of boric acid are charged into a reactor. Heating and agitation are initiated with the mixture being heated to 475–500° F. until esterified. This esterified mixture is then cooled to 200° F. and 1.0 mole of dicyandiamide and 0.10 mole of mannitol is added. Then 5 g. of 85% phosphoric acid is added to catalyst the reaction of the dicyandiamide and mannitol with the prior esterified product. This mixture is held at a temperature of 200° F. until clear, and then 0.01% hydroquinone inhibitor is added and the esterified product further cooled to 150° F. and reduced in solids by 30% with Cellosolve solvent. This mixture is then stored for future use as a fireproof coating.

Example V 1.0 mole pentaerythritol, 0.66 phthalic anhydride and 0.33 mole of boric acid are charged into a reactor. Heating and agitation are initiated. The mixture is heated to 475–500° F. until esterified. The esterified product is cooled to 200° F. and then 1.0 mole of dicyandiamide and 0.10 mole of sorbitol are added. 5 g. of 85% phosphoric acid is then added to catalyze the reactor of the dicyandiamide and sorbitol with the prior esterified product. The mixture is held at a temperature of 200° F. until clear, and then 0.01% hydroquinone inhibitor is added and the final esterified product cooled to 150° F. and reduced in solids by 30% with Carbitol solvent.

Example VI

The procedure of Example V is repeated except that butyl Cellosolve is used as a solvent in place of Carbitol.

Example VII

The procedure of Example V is repeated except that methyl Cellosolve is used in place of Carbitol.

Example VIII

To 100 parts by weight of the resin product of Example V is added 4 parts by weight of 24% lead naphthenate and 2 parts of 6% cobalt naphthenate. This mixture is cast to a film thickness of from 10 mils to 1/16 inch. The film sets by an air drying.

Example IX 1.0 mole of pentaerythritol, 1.0 mole of benzoic acid and 1.0 mole of boric acid are added to a reactor. This mixture is heated with agitation to 475° F. to 500° F. until esterification occurs. The mass is then cooled to 200° F. and 1.0 mole of melamine and 1.0 mole of sucrose are added. 5 g. of 85% phosphoric acid is added to catalyze the condensation of the melamine and sucrose to the first stage reaction product. After completion of condensation the temperature is reduced to 150° F. and Cellosolve solvent is added to be in a concentration of 30% by weight of the final polymer solution. This solution is formed into a film of 10 mils in thickness and allowed to air dry. This film on exposure to a Bunsen burner flame does not ignite, but intumesces. When this film is formed on cardboard (same thickness) and the composite exposed to a flame, the coating does not ignite, and when the burner flame is removed, combustion of the cardboard ceases.

Example X 1 mole dipentaerythritol, 1 mole maleic anhyride and .5 mole boric acid are charged into a reactor. Heating and agitation are started, the mixture is heated to 450–475° F. until esterified, then cooled to 200° F. and 1 mole of guanidine and 0.10 mole of starch added as a solid. Then 5 g. of phosphoric acid (85%) is added to catalyze the addition of the guanidine and starch to the prior esterified product. This is held at 175° F. until clear. Then .01% hyroquinone is added to the mixture. 25 parts of this mixture is then added to 75 parts of the polyester component of a foam. This is blended by mixing followed by a degassing. 100 parts of toluene diisocyanate is added, mixed for 60 seconds and poured into a rectangular mold. The mixture foams and cures.

A blank foam sample is made, but without the addition of the 25 parts of a polymer of this invention. The foam components are mixed, poured into a mold and cured. Both foams are then sectioned and subjected to flame tests. In the test the above blank foam combusts when contacted with the Bunsen flame, and when the flame is removed continues to burn. The foam sample containing the polymer of this invention intumesces and smolders when in the flame, and when the flame is removed there is no combustion of the foam material.

Example XI 30 parts of the polymer of Example I, that is the condensation polymer of Example I diluted with styrene is added to 70 parts of a methyl methacrylate resin. This mixture is well blended. 0.06 part of a 6% cobalt naphthenate and 1.0 part of a 60% methyl ethyl ketone peroxide in dimethylphthalate is added with continued mixing. Mixing is stopped and the blend is degassed and added to a mold containing 12 plies of woven fiber glass cloth. This laminate is heat and pressure cured, and further aged for 72 hours. The panel on flame testing showed no degradation from the flame.

What is claimed is:

1. A noncombustible and fireproofing polymer composition comprising the esterified reaction product of a polyol, a second substance selected from the group consisting of monocarboxylic acids, dicarboxylic acids and acid anhydrides, and boric acid reactively condensed with a ntrogenous spumfic agent and carbohydrate.

2. A polymer composition of claim 1 wherein said polyol is selected from the group consisting of ethylene glycol, propylene glycol, glycerols, pentaerythritol, dipentaerythritol and tripentaerythritol.

3. A polymer composition of claim 2 wherein said second substance is selected from the group consisting of maleic anhydride, phthalic anhydride, maleic acid, phthalic, acids, benzoic acid and salicylic acid.

4. A polymer composition as in claim 3 wherein said nitrogenous spumific agent is selected from the group consisting of dicyandiamide, urea, melamine and guanidine.

5. A polymer composition as in claim 4 wherein said carbohydrate is selected from the group consisting of starch, mannitol, sorbitol, sucrose, mannose and galactose.

6. A polymer composition as in claim 5 which further contains a diluent selected from the group consisting of styrene moonmer, vinyl toluene, ethyl acrylate, monoalkyl glycol ethers and dialkyl glycol ethers.

7. A polymer composition as in claim 1 wherein said polyol is pentaerythritol, said second substance is phthalic anhydride, said spumific nitrogenous material is dicyandiamide and said carbohydrate is starch.

8. The method of producing the polymer composition of claim 1 comprising:
charging a reactor with said polyol, said second substance and said boric acid;
heating said reactor to condensively react the charged substances and produce a first esterified condensation product;
cooling said reactor to 150° F. to 300° F. and adding said nitrogenous spumific agent, said carbohydrate and an acid catalyst to condensively reactor said first esterified condensation product with said nitrogenous spumific material and said carbohydrate; recovering said polymer composition.

9. The method of claim 8 wherein said polyol is selected from the group consisting of ethylene glycol, propylene, glycol, glycerols, pentaerythritol, dipentaerythritol and tripentaerythritol, and said nitrogenous spumific substance is selected from the group consisting of dicyandiamide, urea, guanidine and melamine.

10. The method of claim 9 wherein said carbohydrate is selected from the group consisting of starch, sucrose, galactose, mannose, mannitol, and sorbitol.

11. The method of claim 8 wherein in the step of producing said first condensation product said reactor is heated to about 400° F. to 550° F.

12. The method of claim 11 wherein said reactor is cooled to 175° F. to 250° F., and said acid catalyst is phosphoric acid.

13. An article comprising a substrate which is coated with the polymer composition of claim 6.

14. An article as in claim 13 wherein said substrate is selected from the group consisting of papers, cardboards, wood, fiber, leather, fabrics, rubber, linoleum and wire.

15. An article comprising a fiber formed from the polymer composition of claim 6.

16. An article comprising at least two substrates, said substrates being adhesively bonded using the polymer composition of claim 6.

17. An article as in claim 16 wherein at least one of said substrates is wood.

18. An article comprised of a polymeric foam and incorporating the polymer composition of claim 1.

19. A latex paint composition comprising an aqueous dispersion of polyvinylacetate and the polymer of claim 1.

20. A film comprised of the polymer composition of claim 6.

References Cited

UNITED STATES PATENTS

| | | | |
|---|---|---|---|
| 2,912,392 | 11/1959 | Stilbert, Jr. et al. | 260—2.5 FP |
| 2,912,393 | 11/1959 | Stilbert, Jr. et al. | 260—2.5 FP |
| 2,912,394 | 11/1959 | Stilbert, Jr. et al. | 260—2.5 FP |
| 2,056,211 | 10/1936 | Rosenblum | 260—2 M |
| 3,037,951 | 6/1962 | Basto et al. | 260—2.5 FP |

MURRAY TILLMAN, Primary Examiner

M. FOELAK, Assistant Examiner

U.S. Cl. X.R.

117—136; 161—270, 403; 260—2.5 N, 9, 17 R, DIG. 24